3,197,490
PROCESS FOR THE PRODUCTION OF 6-METHYL PREGNANES AND ANDROSTANES
Susumu Nakanishi, Hopkins, Minn., assignor to General Mills, Inc., a corporation of Delaware
No Drawing. Filed Mar. 19, 1963, Ser. No. 266,177
10 Claims. (Cl. 260—397.3)

This invention relates to the preparation of 6-alkyl steroid compounds and in particular to the preparation of the 6-methyl steroid compounds.

The 6-alkyl steroid compounds and their biological activity are well known. Illustrative of such compounds are 6-methylprogesterone, 6-methyl-17-hydroxy (or acyloxy) progesterone, 6-methyl ethisterone, 6-methyl testosterone and the 17-acyloxy derivatives thereof. Such 6-alkyl compounds have been prepared in the past by a variety of methods, one such method being the classical Grignard reaction on the 5,6-epoxides.

A new method of preparation of such compounds has now been discovered which comprises alkylation of the enol ether of the steroid compound with an alkylating agent. The method is applicable to the pregnane and androstane series and provides the known products which are useful in their known manner as progestational, cortical and androgenic agents.

It is therefore an object of this invention to provide a novel method of preparing 6-alkyl steroid compounds.

It is also an object of this invention to provide a method of alkylating enol ether compounds.

Briefly, the invention consists in reacting a 3-alkoxy-3,5-diene steroid compound with an alkylating agent such as, an alkyl halide, alkyl-p-toluene sulfonates and methyl alkanesulfonates to provide the 6-alkyl derivative. The reaction can be illustrated as follows:

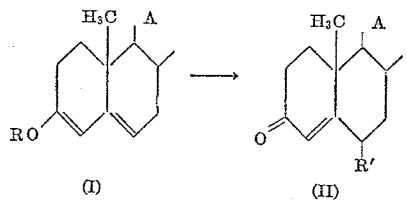

where A is selected from the group consisting of

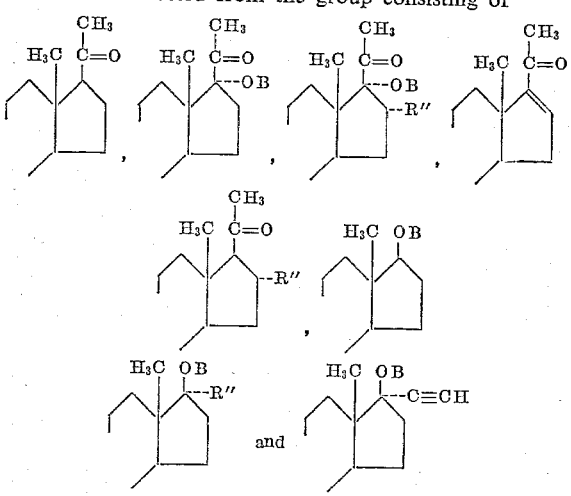

R, R', and R'' are alkyl groups having from 1 to 8 carbon atoms and B is selected from the group consisting of H and

where R''' is an alkyl, cycloalkyl, aralkyl or alkoxyaralkyl group, the alkyl group generally having from 1 to 12 carbon atoms and the aryl group generally being phenyl. As is apparent OB represents the hydroxy compounds or the acylates thereof. Illustrative of these usual ester groups are the acetate, caproate, cyclopentyl propionate, phenyl propionate, p-propoxyphenyl propionate, p-hexoxyphenyl propionate and p-dodecoxyphenyl propionate. Illustrative of the alkyl groups R, R' and R'' are methyl, ethyl, propyl, isopropyl, butyl, isobutyl, test-butyl, pentyl, hexyl, heptyl and octyl.

The enol ether compounds represented by I above, which are the starting materials for the alkylation step, may be prepared in the conventional manner from the parent compounds as indicated below:

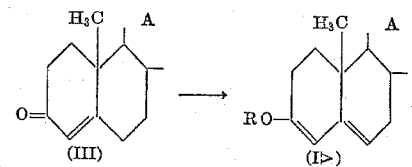

where R and A are as defined above. Such methods of preparation have been described by A. Serini and H. Koster, Ber., 71, 1766 (1938), and A. Ercoli and R. Gardi, J. Am. Chem. Soc., 82, 746 (1960).

As indicated, the starting materials have the Formula I set forth above. The alkylating agents employed for the alkylation may be illustrated by the formulae R'X, R'OSO$_2$C$_6$CH$_3$ or R'OSO$_2$CH$_3$, where R' is as previously defined and X is a halogen atom such as Cl, Br, and I. While the invention is not to be limited to this particular mechanism of reaction, it is believed that the reaction proceeds by electrophyllic attack of the alkyl group at the negative center at position 6 followed by loss of a proton to produce the alkylated enol ether which on subsequent addition of water is rapidly hydrolyzed to the alkylated ketone. It is thus generally necessary to follow the alkylation reaction with hydrolysis to provide the alkylated ketone.

The alkylation reaction is carried out by adding the alkylating agent to a solution of the starting material and heating within the range of 20° to 160° C. The heating is generally conducted at reflux temperatures and the only limitation on the temperature is that it be below the decomposition temperature of the reaction mixture. The time of reaction is dependent largely on the temperature employed. Within the temperature range stated above, the reaction is generally completed at between 5 hours to 17 days.

Any organic solvent, inert under conditions of reaction which will not interfere with the reaction, may be employed for dissolution of the starting material. In general, the alkanols having from 1 to 12 carbon atoms may be employed, ketones such as acetone, 3-pentanone and iso-butyrane, and organic nitrogen containing compounds such as dimethyl formamide and pyridine.

After the alkylation reaction, the product may be recovered in any conventional manner such as extraction, drying and crystallization. As indicated previously, the alkylated product is generally then hydrolyzed in the conventional manner to provide the final products which are then recovered.

The hydrolysis generally involves addition of either mineral acid such as hydrochloric acid, sulfuric acid or an aqueous base such as the alkali metal hydroxides i.e., sodium hydroxide and potassium hydroxide. Both acid catalyzed and base catalyzed hydrolysis are carried out by standing the mixture at room temperature for from a few minutes to several hours or heated under reflux for 5 minutes to several hours. In either case the completion of hydrolysis can be seen by reappearance of the infrared carbonyl absorption.

The invention can be further illustrated by means of the following examples:

Example I

Progesterone, 3 g., was dissolved in a mixture of 10 ml. of dry benzene, 2 ml. of triethyl orthoformate, 1.8 ml. of absolute alcohol, 10 drops of 8% hydrochloric acid in alcohol and was heated under reflux for two hours. The reaction mixture was cooled, saturated sodium hydroxide alcohol solution was added, diluted with water, extracted with ether, dried over magnesium sulfate and was evaporated under reduced pressure to give 3.24 g. (99%, M. 92–98° C.) of crystalline material. Recrystallization from absolute alcohol with pyridine furnished 3.108 g., 98%, M. 96–98° C.

Two recrystallizations from absolute alcohol and pyridine gave analytical sample of pregna - 3,5 - diene - 3,20-dione-3-ethyl ether, M.P. 102–103.5° C.

Analysis.—Calcd. for $C_{23}H_{34}O_2$: C=80.65; H=10.00. Found: C=80.63; H=10.00.

3-ethoxy-pregna-3,5-diene-20-one, 1.66 g., was dissolved in 100 ml. of acetone with 300 mg. of sodium tert.-butoxide and methyl chloride was bubbled at room temperature for 10 minutes. Then 50 ml. of reaction mixture was poured into water, acidified to pH 2 with conc. hydrochloric acid, extracted with ether, washed with water to neutral, dried over magnesium sulfate, evaporated to give 750 mg. of oil. The rest of 50 ml. was kept at room temperature overnight and then was poured into water and acidified, extracted to give 870 mg. of oil. The infrared spectrum on both materials obtained were identical. The study of paper chromatogram and gas chromatography and mass spectrum on these crude samples as well as infrared spectrum indicated that 22–23% of 6ξ-methyl progesterone was present.

Epimerization of 6ξ-methyl progesterone (500 mg.) was dissolved in 25 ml. of methanol and 5 ml. of water containing 0.5 g. of potassium hydroxide was refluxed under nitrogen for 16 hours. After 16 hours the mixture was taken up by ether, washed to neutral, dried over magnesium sulfate, filtered, evaporated to give 442 mg. of oil which was chromatogrammed on 20 g. of neutral alumina.

The elutions with benzene gave 159 mg., M.P. 115–119°, after recrystallization from n-hexane and acetone gave pure 6α-methyl progesterone, M.P. 117–118.5° C., $\nu^{KBr}$ 5.88, 5.99, 6.20, 11.60μ;

$\lambda_{max}^{EtOH}$ 241 mμ ($\epsilon$=16,900), $[\alpha]_D$+176° (c.=1, CHCl$_3$) max.

Analysis.—Calcd. for $C_{22}H_{32}O_2$: C=80.44; H=9.82. Found: C=80.53; H=9.80.

There was observed no mixed melting depression with authentic sample. The mass spectrum showed clear parent peak of M/e 328 and B ring cleavage of 138, as well as 313 (M=CH$_3$), 310 (M=H$_2$O), 286 (M=42), 243 (D ring cleavage).

Example II

The enol ether of Example I, 3 g., M. 96–98° C., was dissolved in 100 mg. of tertiary-butanol and was added to a boiling solution of sodium-tert.-butoxide, prepared by dissolving 2 g. of sodium metal in 50 ml. of tertiary-butanol, and then 50 ml. of methyl iodide was added in several portions and the mixture was heated under reflux for 16 hours.

Then the excess methyl iodide and tertiary-butanol was distilled (about 100 ml. of distillate was collected) and the reaction mixture was cooled and poured into ice-water with hydrochloric acid and the resulting mixture was kept at room temperature for one and one-half hours at pH 2.

The resulting suspension was extracted with ether, washed well with water to neutral, dried over magnesium sulfate and evaporated to dryness to give crude crystalline material (2.863 g., M.P. 102–109° C.). Recrystallization from aqueous methanol gave the first crop of 6ξ-methyl progesterone, 2.760 g., M.P. 107–112° C. The infrared absorption spectrum on this compound shows that the carbonyl absorption shift from 6.01 to 5.99μ and C=C—H absorption shift from 11.45 to 11.60 is significant and thus indicates the compound is mainly 6α-methyl progesterone. A portion of this compound was recrystallized once more from aqueous methanol and gave a M.P. of 111–114° C.

2.6 g. of the above 6ξ-methyl progesterone (M.P. 107–112° C.) was dissolved in 200 ml. of chloroform which contains 0.75% ethanol and 0.5 ml. of ethanol was added and the mixture was cooled to 0° in ice bath. Then dry hydrogen chloride was passed into the stirring solution of 6ξ-methyl progesterone at 0° for 2½ hours.

Then the mixture was washed with water, saturated sodium bicarbonate solution, water, dried over magnesium sulfate, evaporated to give 2.465 g., M.P. 114.5–118° C. Recrystallization from acetone and n-hexane gave the first crop of 6α-methyl progesterone, 2.392 g., M.P. 117–18.5° C.

Another recrystallization from acetone and n-hexane gave the first crop of 2.128 g., M.P. 118.5–120° C. $\nu^{KBr}$ 5.88, 5.99, 6.20, 11.60μ;

$\lambda_{max}^{EtOH}$ 241 mμ ($\epsilon$=16,984); $[\alpha]_D$+176° (c.=1, CHCl$_3$)

Example III 3.2 g. of the progesterone enol ether was dissolved in 100 ml. acetone with 12 g. of potassium carbonate and 50 ml. MeI and the mixture was refluxed for 48 hours under nitrogen atmosphere. Then excess of methyl iodide was distilled off and potassium carbonate was filtered, washed with acetone, extracted with methylene chloride, washed and dried over magnesium sulfate and evaporated to give 2.675 g. which mass spectrum shows the parent peak of 328 with p-70 peak due to the isoprogesterone. The yield of 6ξ-methyl progesterone was estimated by mass spectrum and gas chromatography to be about 19%.

Replacing methyl bromide instead of methyl iodide gave the similar results.

Example IV

A solution of the progesterone enol ether 1 g. in 70 ml. of tert.-butanol and 30 ml. of methyl iodide was refluxed for 3 hours, then additional 20 ml. of methyl iodide was added and the mixture was refluxed for 20 hours. Excess methyl iodide was distilled off and the solvent was concentrated to about half, diluted with water, acidified to pH 2 with concentrated hydrochloric acid and the mixture was kept at room temperature for 1 hour, then was extracted with ether, washed, dried, evaporated to give 780 mg. of oily crystal. The analysis by gas chromatography, mass spectroscopy and thin layer chromatography indicated the presence of both 6α- and 6β-methylprogesterone. A solution of crude 6ξ-methylprogesterone, 750 mg. in 30 ml. of methanol and 7 ml. of water containing 0.7 g. potassium hydroxide was refluxed under nitrogen atmosphere for 16 hours, then was cooled and the mixture was taken up with ether, washed to neutral, dried over magnesium sulfate and was evaporated to give 644 mg., M.P. 45–70° C. The yield of 6α-methylprogesterone was estimated by mass spectrum, gas chromatography and thin layer chromatography to be about 5 to 10%.

Example V

Testosterone 2.65 g. in 10 ml. of dry benzene, 2 ml. of triethyl orthoformate, 1.8 ml. of absolute alcohol and 10 drops of 8% hydrochloric acid in alcohol was heated at reflux for 2 hours and the similar treatment as described in Example I, furnished 2.78 g., 96%, M. 112–117° C. Recrystallization from absolute alcohol and pyridine gave the first crop of 2.71 g., 85%, M.P. 121–123° C.

Reported M.P. 118–122° C. and M.P. 123–6° C.

Testosterone enol ether, 2.7 g., was dissolped in 100 ml. of pyridine; then 50 ml. of methyl iodide was added. The pyridine-methyl iodide molecular complex was formed by exothermic reaction. Therefore, 150 ml. of methanol and an additional 50 ml. of methyl iodide was added and the resulting mixture was refluxed for 15 hours. Then excess methyl iodide was distilled and about 150 ml. of distillate was collected. Then the reaction mixture was poured into ice-water, acidified with concentrated hydrochloric acid to pH 2 and was allowed to stand at room temperature for 30 minutes. It was then extracted with ether, washed with water and sodium bisulfite solution, salt water, dried over magnesium sulfate, evaporated to give crystalline material 1.887 g., 73%, M.P. 148–152° C. Recrystallization from n-hexane and acetone gave two different crystal forms. The larger rectangular crystal was separated and weighed 1.247 g., M.P. 151.5–153° C., which was proved to be the starting testosterone and the fine needle crystal was separated to give 232 mg., 9%, M.P. 153–4° C. After two recrystallizations, furnished 6α-ethyl testosterone, 220 mg., M.P. 153–4° C., $\nu^{KBr}$ 5.96, 6.18, 11.51μ;

$\lambda^{EtOH}_{max.}$ 241 mμ; $[\alpha]_D + 90°$

Example VI 16-dehydroprogesterone, 3 g., in 20 ml. of dry benzene, 2 ml. of triethyl orthoformate, 1.8 ml. of absolute alcohol and 10 drops of 8% hydrochloric acid in absolute alcohol was heated to reflux for 2 hours and treated in the similar manner as described in Example I. Yield: 3.245 g., 99%, M.P. 146.5–149° C. Recrystallization from absolute alcohol and pyridine furnished the pure pregna-3,5,16-triene-3,20-dione-3-ethyl ether, 3.105 g., 95%, M.P. 148–150° C.; $[\alpha]_D -97°$ (c.=1, CHCl$_3$); $\nu^{KBr}$ 6.01, 6.14 and 6.30 and 9.57μ. The enol ether, 3 g., in 100 ml. of tertiary-butanol when treated in the analogous manner as Example 1 with 1.5 g. of sodium in 50 ml. of tert.-butanol and 50 ml. of methyl iodide at reflux temperature for 16 hours gave 6ξ-methyl-16-dehydroprogesterone, 2.585 g., M.P. 152–153° C., $\nu^{KBr}$ 6.01, 6.18 and 4.29μ.

The epimerization in potassium hydroxide-tert.-butyl alcohol gave 6α-methyl-16-dehydroprogesterone, M.P. 171–172.5° C., $[\alpha]_D + 145°$ (c.=1, CH$_3$), $\lambda^{EtOH}_{max.}$ 240 mμ; $\nu^{KBr}$ 6.01, 6.21 6.29μ

Example VII

A solution of 17α-methyltestosterone in 10 ml. of dry benzene, 10 ml. of triethyl orthoformate and 10 ml. of absolute alcohol with 10 drops of 8% concentrated hydrochloric acid in absolute alcohol was slowly refluxed for 16 hours. Then the mixture was cooled to room temperature and about 50 ml. of saturated sodium hydroxide solution in absolute alcohol was added and then about 20 ml. of distilled water was added. The mixture was taken up with ether, ether layer was well washed with sodium chloride-water, dried over magnesium sulfate, filtered and evaporated to give 3.593 g., M.P. 123–5° C., $\nu^{KBr}$ 3.06, 6.05, 6.14, 9.49, 11.46, 11.65μ. There was no 3 ketone absorption (5.99μ) existed. Recrystallization from absolute alcohol with a drop of pyridine gave analytical sample 3.14 g. of 3-ethoxy-17α-methyl-androst-3,5-diene-17β-ol, M.P. 125–125° C., $\nu^{KBr}$ 3.06, 6.05, 6.14, 9.49, 11.46, 11.65μ; $[\alpha]_D$ 1° (c.=1, CHCl$_3$). 3-ethoxy-17α-methyl-androst-3,5-diene-17β-ol, 1 g., was dissolved in 70 ml. of tert.-butanol and dry nitrogen gas was bubbled for 3 minutes and then 30 ml. of methyl iodide was added and the mixture was refluxed for 3 hours, then additional 20 ml. of methyl iodide was introduced and the mixture was refluxed for 16 hours. Excess methyl iodide and solvent were slowly distilled out and was concentrated to about half, then was diluted with water, acidified to pH 2 with concentrated hydrochloric acid, extracted with ether, washed to neutral with water, salt water, dried over magnesium sulfate, filtered and evaporated to give 760 mg. of oily crystal which was crystallized by triturating with n-hexane, M.P. 82–91° C. Recrystallization from n-hexane and acetone furnished 6ξ,17α-dimethyl-testosterone, 752 mg., M.P. 96–99° C., $\nu^{KBr}$ 2.95, 5.99, 6.19, 10.90μ. A solution of the above 6ξ,17α-dimethyl-testosterone 500 mg. in 25 ml. of methanol and 5 ml. of water containing 0.5 g. of potassium hydroxide was refluxed under nitrogen atmosphere for 16 hours, cooled to room temperature and was taken up with water, washed to neutral, dried over magnesium sulfate and evaporated to give 483 mg., M.P. 120–135° C., $\nu^{KBr}$ 2.95, 5.99, 6.19 . Thin layer chromatography result showed about 60–70% was 6α,17α-dimethyltestosterone. Alumina (19 g.) chromatography of 380 mg., M.P. 120–135° C., gave 182 mg., M.P. 134–7° C. by elutions with benzene. Recrystallization from aqueous methanol gave pure 6α,17α-dimethyltestosterone, 150 mg., M.P. 136–7° C., $\lambda^{EtOH}_{max.}$ 242 mμ

Example VIII

A solution of 16α-methyl-17α-hydroxy-progesterone, 3 g., in 10 ml. of dry benzene, 6 ml. of triethyl orthoformate, 6 ml. of absolute alcohol and 10 drops of 8% hydrochloric acid in absolute alcohol was slowly refluxed for 2 hours, then additional 3 ml. of triethyl orthoformate was introduced and the mixture was refluxed additional 3 hours. The mixture was cooled, basified with saturated solution of sodium hydroxide in absolute alcohol, diluted with water, extracted with ether, washed to neutral with water, dried and evaporated to give 3.32 g., M.P. 134–139° C., $\nu^{KBr}$ 2.89, 6.06, 6.14, 9.51, 11.05, 11.14μ . Recrystallization from absolute alcohol containing a drop of pyridine gave 2.86 g., M.P. 141–2° C., $\nu^{KBr}$ 2.89, 6.06, 6.14, 9.51, 11.05, 11.14μ $[\alpha]_D$ (c.=1, CHCl$_3$).

A solution of 3-ethoxy-16α-methyl-pregna-3,5-diene-17α-ol-20-one, M.141–2° C., 1 g. in 70 ml. of tert.-butanol and 30 ml. of methyl iodide was refluxed for 3 hours and additional 20 ml. of methyl iodide was introduced and the mixture was refluxed for 18 hours. Excess methyl iodide was distilled off and the solvent was concentrated to about half, diluted with water, acidified to pH 2 with concentrated hydrochloric acid and the mixture was kept at room temperature for 2 hours, then was extracted with ether, washed to neutral, dried and evaporated to give 892 mg., M.P. 110–128° C., $\nu^{KBr}$ 2.91, 5.88, 6.02, 6.20μ and the following new peaks: 7.19, 8.10, 9.85, 10.36, 11.04 and 11.45μ. The analysis by mass spectrum, gas chromatography and thin layer chromatography indicated the amount of 6-methylated compound to be 20–25%. Recrystallization from n-hexane and acetone four times gave pure 6α,16α-dimethyl-4-pregnene-17α-ol-3,20-dione, 136 mg., M.P. 203–207° C., $\nu^{KBr}$ 2.89, 5.88, 6.04, 6.24, 7.69 (weak), 8.09, 9.85 (w.), 10.45 (w.), 11.05 (w.) and 11.45μ.

Example IX

The progesterone enol ether, 1 g., in 70 ml. of tert.-butanol and 50 ml. of methyl p-toluenesulfonate was refluxed slowly for 24 hours, then was concentrated to about half, diluted with water acidified with concentrated hydrochloric acid to pH 2 and the mixture was kept at room temperature for 1 hour, extracted with ether, washed to neutral, dried, evaporated to give 822 mg. of oil. From the analysis on this crude oil by mass spectrum, gas chromatography and thin layer chromatography the amount of 6ξ-methyl-progesterone was estimated to be 2 to 10%.

Example X 3-ethoxy-17α-methyl-androst-3,5-diene-17β-ol, 1 g., in 70 ml. of tert.-butanol and 50 ml. of methyl methanesulfonate was refluxed for 20 hours, concentrated to about half by distillation, diluted with water, acidified with concentrated hydrochloric acid to pH 2, kept at room temperature for 1 hour and then was extracted with ether, washed to neutral, dried over magnesium sulfate, filtered and evaporated to dryness to give 915 mg. of oil. From the analysis on this crude product by mass spectrum, gas chromatography and thin layer chromatography the amount of 6-methylated compound, namely, 6α- and 6β-17α-dimethyl-testosterone was estimated between 5 to 20%.

It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A process of preparing 6-alkyl steroid compounds comprising treating with an alkylating agent selected from the group consisting of R'X, R'OSO$_2$C$_6$H$_4$CH$_3$ and R'OSO$_2$CH$_3$ in which R' is an alkyl group having from 1 to 8 carbon atoms and X is a halogen atom, a steroid compound having the formula

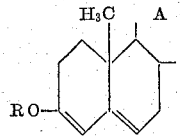

where R is an alkyl group having from 1 to 8 carbon atoms and A is selected from the group consisting of

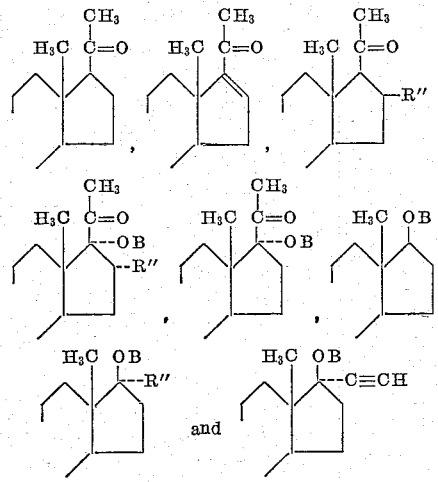

and in which R'' is an alkyl group having from 1 to 8 carbon atoms and B is selected from the group consisting of H and

where R''' is selected from the group consisting of alkyl, cycloalkyl, aralkyl and alkoxyaralkyl groups in which the alkyl group has from 1 to 12 carbon atoms and the aryl group is phenyl.

2. A process of preparing 6α-methyl progesterone comprising treating 3-ethoxy-pregna-3,5-diene-20-one with methyl chloride.

3. A process of preparing 6α-methyl progesterone comprising treating 3-ethoxy-pregna-3,5-diene-20-one with methyl iodide.

4. A process of preparing 6α-methyl progesterone comprising treating 3-ethoxy-androst-3,5-diene-17β-ol with methyl bromide.

5. A process of preparing 6α-methyl progesterone comprising treating 3-ethoxy-pregna-3,5-diene-20-one with methyl p-toluenesulfonate.

6. A process of preparing 6α-methyltestosterone comprising treating 3-ethoxy-androst-3,5-diene-17β-ol with methyl iodide.

7. A process of preparing 6α-methyl-16-dehydroprogesterone comprising treating 3-ethoxy-pregna-3,5,16-triene-3,20-dione with methyl iodide.

8. A process of preparing 6α,17α-dimethyltestosterone comprising treating 3-ethoxy-17α-methyl-androst-3,5-diene-17β-ol with methyl iodide.

9. A process preparing 6α,17α-dimethyltestosterone comprising treating 3-ethoxy-17α-methyl-androst-3,5-diene-17β-ol with methyl methanesulfonate.

10. A process of preparing 6α,16α-dimethyl-4-pregnene-17α-ol-3,20-diene comprising treating 3-ethoxy-16α-methyl-pregna-3,5-diene-17α-ol-20-one with methyl iodide.

No references cited.

LEWIS GOTTS, *Primary Examiner.*